(12) United States Patent
Kim et al.

(10) Patent No.: US 6,459,463 B2
(45) Date of Patent: *Oct. 1, 2002

(54) REFLECTIVE LIQUID CRYSTAL DISPLAY HAVING A BENT SHAPE AND METHOD OF MANUFACTURING THEREOF

(75) Inventors: Yong Boem Kim; Jeong Min Moon; Sung Joon Bae, all of Kyungki-do; Jae Hong Jun, Seoul, all of (KR)

(73) Assignee: L.G. Philips LCD Co., Ltd., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/097,372

(22) Filed: Jun. 15, 1998

(30) Foreign Application Priority Data

Jun. 14, 1997 (KR) ............................................. 97-24742
Jun. 12, 1998 (KR) ............................................. 98-22044

(51) Int. Cl.$^7$ ...................... G02F 1/1335; G02F 1/1333
(52) U.S. Cl. ........................ 349/113; 349/110; 349/111
(58) Field of Search ................................. 349/113, 110, 349/111

(56) References Cited

U.S. PATENT DOCUMENTS

| | | | | |
|---|---|---|---|---|
| 4,568,149 A | * | 2/1986 | Sugata et al. | 349/111 |
| 5,327,001 A | * | 7/1994 | Wakai et al. | 349/110 |
| 5,500,750 A | | 3/1996 | Kanbe et al. | |
| 5,949,507 A | * | 9/1999 | Shimada et al. | 349/113 |
| 6,018,379 A | * | 1/2000 | Mizobata et al. | 349/112 |
| 6,061,111 A | * | 5/2000 | Kataoka et al. | 349/113 |
| 6,163,405 A | * | 12/2000 | Chang et al. | 359/599 |
| 6,262,783 B1 | * | 7/2001 | Tsuda et al. | 349/39 |

* cited by examiner

Primary Examiner—William L. Sikes
Assistant Examiner—Tarifur R. Chowdhury
(74) Attorney, Agent, or Firm—McKenna Long & Aldridge, LLP

(57) ABSTRACT

A reflective-type liquid crystal display device includes first and second substrates, a liquid crystal layer between the first and second substrates, thin film transistors on each cross of gate and data bus lines, a photoresist layer on the gate and data bus lines, and thin film transistors, reflection electrodes on the photoresist layer and electrically coupled to the thin film transistors, and light shield layers on the gate and data bus lines.

27 Claims, 3 Drawing Sheets

REFLECTIVE LIQUID CRYSTAL DISPLAY HAVING A BENT SHAPE AND METHOD OF MANUFACTURING THEREOF

BACKGROUND OF THE INVENTION

A. Field of the Invention

This invention relates to a liquid crystal display device and, more particularly, a reflective-type liquid crystal display device and a method of manufacturing thereof.

B. Description of the Related Art

The liquid crystal display device (hereinafter "LCD") can be classified into a transmissive-type LCD using a back light and a reflective-type LCD using a surrounding light in accordance with the driving type. The transmissive-type LCD, however, requires a high consumption power. Further, it is difficult to minimize the apparatus due to the back light.

For the above reason, recently, the reflective-type LCD have been extensively studied.

A matter of concern for the reflective-type LCD is to use the surrounding light effectively. Thus, at present, a reflective-type LCD having a light compensation film is proposed which is provided at an inner side and/or outer side of the apparatus or a modified structure of reflector being.

U.S. Pat. No. 5,500,750 proposes a reflector having convex portions. The above patent discloses a structure comprising a pair of substrates having a liquid crystal layer therebetween, a plurality of bumps on the lower substrate, an insulating layer on the bumps, and a plurality of reflection electrodes on the insulating layer and thin film transistors (hereinafter "TFT"). In this structure, the reflection electrode which functions as a black matrix on the TFT is electrically insulated from other electrodes, and a plurality of black filters shield open regions between neighboring reflection electrodes.

The above LCD, however, has been manufactured by complex processes, and does not use the surrounding light effectively. Namely, since the black filter is disposed in the direction where light is incident, an incidence area of light is limited and a light leakage may be generated at the opened regions between neighboring reflection electrodes.

SUMMARY OF THE INVENTION

In view of the foregoing, it is an object of the present invention to provide a reflective-type LCD having a superior efficiency and to provide a method of manufacturing thereof.

The object and advantages of the invention will be realized and attained by means of the elements and combinations particularly pointed out in the appended claims.

To achieve the object and in accordance with the purpose of the invention, as embodied and broadly described herein, the invention includes first and second substrates, a liquid crystal layer between the first and second substrates, a photoresist layer on the first substrate, a plurality of reflection electrodes on the photoresist layer, a plurality of black matrixes on open. regions between neighboring reflection electrodes, a first alignment layer over the first substrate, a counter electrode on the second substrate, and a second alignment layer over the second substrate.

According to another aspect of the invention, the reflection electrodes are opened at TFT regions as well as between neighboring reflection electrodes.

A method according to the invention includes the steps of providing first and second substrates, forming a plurality of TFTs on the first substrate, forming a photoresist layer over the first substrate, forming a plurality of black matrixes on the photoresist layer, forming a plurality of reflection electrodes on the photoresist layer and the black matrixes, providing first and second alignment layers on the first and second substrates, and providing a liquid crystal layer between the first and second substrates.

It is to be understood that both the foregoing general description and the following detailed description are exemplary and explanatory only and are not restrictive of the invention, as claimed.

The accompanying drawings, which are incorporated in and constitute a part of this specification, illustrate the embodiments of the invention and, together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1A:
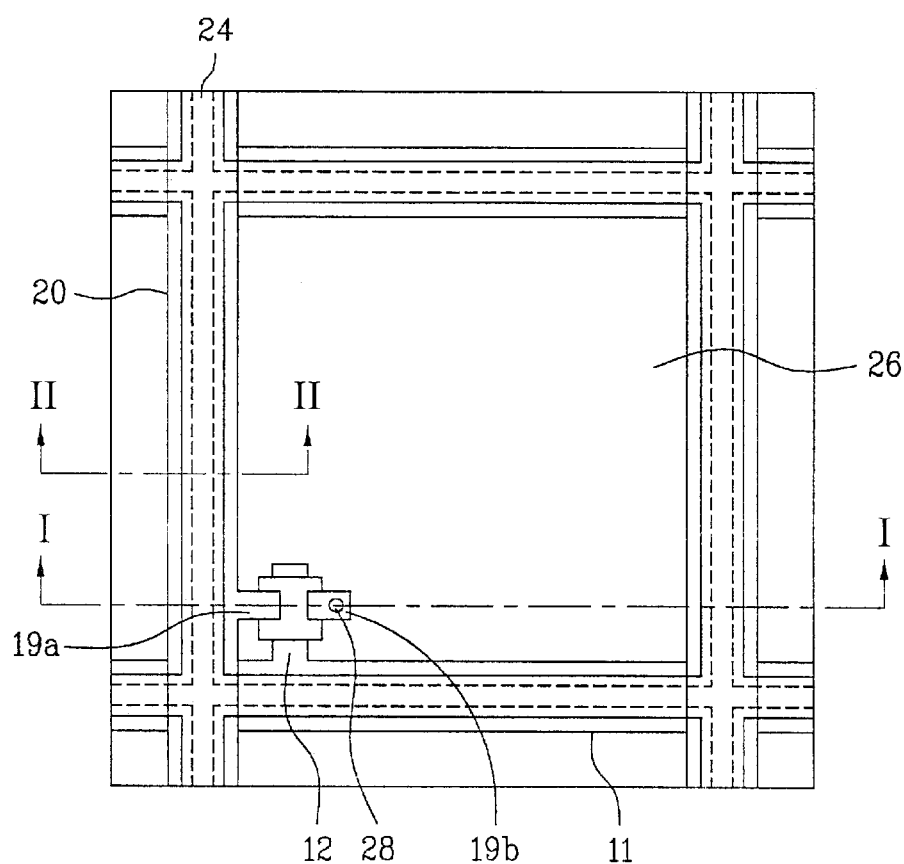
FIG. 1A is a plan view of an LCD in accordance with a first embodiment of the present invention.
Figure 1B:
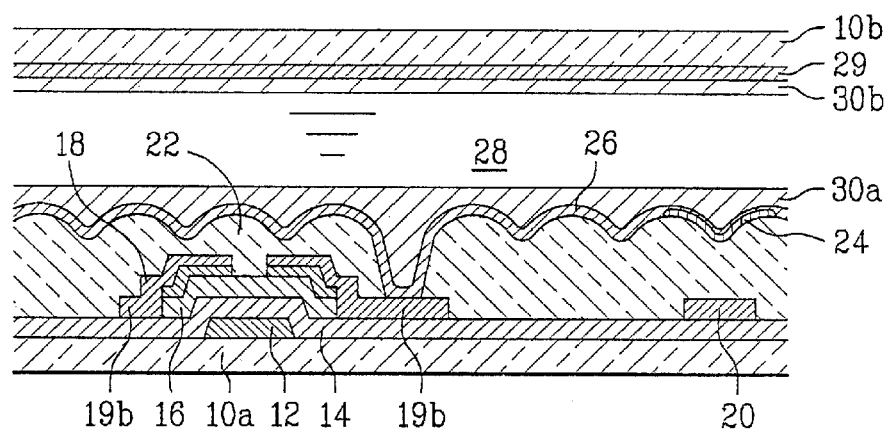
FIG. 1B is a sectional view in accordance with line A—A of FIG. 1A.

FIG. 1A is a plan view of an LCD in accordance with a first embodiment of the present invention, and FIG. 1B is a sectional view in accordance with line A—A FIG. 1A As shown in the drawings, an unit pixel in accordance with the present invention is represented by, a gate bus line 11, a data bus line 20, and a gate electrode 12 on a first substrate 10a, a gate insulator 14 on the first substrate 10a, a semiconductor layer 16, an ohmic contact layer 18, a source electrode 19a, and a drain electrode 19b on the gate insulator 14, a photoresist layer 22 over the first substrate 10a, a black matrix 24 on the photoresist layer 22, a reflection electrode 26 on the photoresist layer 22, a first alignment layer 30a on the reflection electrode 26, a counter electrode 29 on a second substrate 10b, and a second alignment layer 30b on the counter electrode 29.

A method for manufacturing the LCD having above-mentioned structure is described in detail hereinafter.

The gate electrode 12 is formed by depositing and patterning a metal such as Ta, Cr, or Al by the sputtering method on the first substrate 10a, at this time the gate bus line 11 is formed. The gate insulator 14 is formed by depositing an inorganic material such as SiNx or SiOx by the PECVD (plasma enhanced chemical vapor deposition) method on the gate insulator 14 and the first substrate 10a. The semiconductor layer 16 and the ohmic contact layer 16 are formed by depositing and patterning materials such as a-si:H and n⁺a-si:H by the PECVD method. Then, source electrode 19a, the drain electrode 19b, and the data bus line 20 are formed by depositing a metal such as Ti, Cr/Al, Cr/Al—Ta, or Cr/Al/Al—Ta by sputtering method.

To form the photoresist layer 22 on the TFT and the gate and data bus lines 11, 20 photopolymer resin such as acrylic resins is deposited over the first substrate 10a, the photopolymer resin is exposed to light such as ultraviolet light with a mask (not shown) having a plurality of micro patterns, the photopolymer resin exposed to light is partially developed whereby a surface of the photopolymer resin is continually bent. In that process, two regions to be developed or undeveloped are determined by the micro patterns of the mask. Further, a size of the region to be developed is preferably 0.1–0.5 where d is the thickness of the photoresist layer 22 and is in a range of 1–5 micrometers. A bent shape of the surface is determined by light exposure time and/or developing time.

The reflection electrode 26 is formed by depositing a metal such as Al or Ag by evaporation or sputtering methods on the photoresist layer 22. At this time, the reflection electrode 26 is electrically coupled to the drain electrode 19b through a contact hole 28. Further, the neighboring reflection electrodes on the gate and data bus lines 11, 20 are electrically insulated from each other.

The label 24 in the drawing represents a black matrix. The black matrix 24 is formed by depositing a material such as a black resin at an open region on the gate and data bus lines 11, 20.

The first and second alignment layers 30a, 30b are formed a rubbing method using polyimide, polyamide, polyvinyl alcohol, polyamic acid, or $SiO_2$ and/or photo-alignment method using a photo-alignment material such as polysiloxanecinnamate, polyvinylcinnamate, or celluosecinnamate. For the photo-alignment method, it is possible to expose UV light to at least one surface of the substrates using non-polarized light or partially polarized light.

The counter electrode 29 is formed by depositing a transparent metal such as ITO(indium tin oxide) by the sputtering method.

Figure 2A:
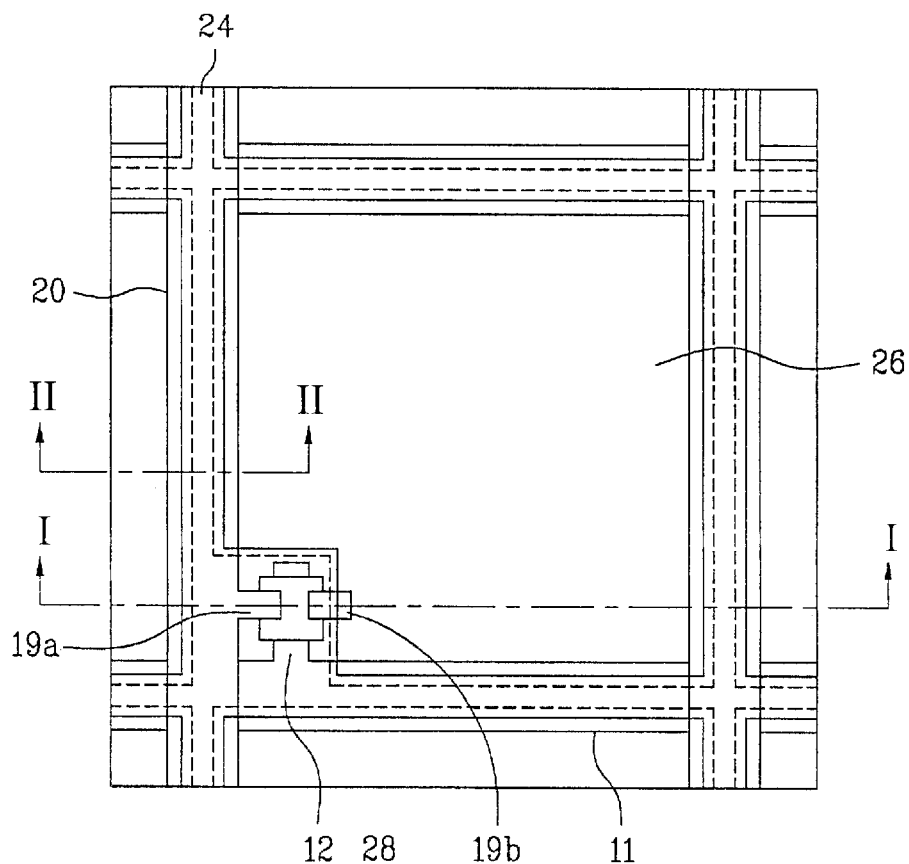
FIG. 2A is a plan view of an LCD in accordance with a second embodiment of the present invention.
Figure 2B:
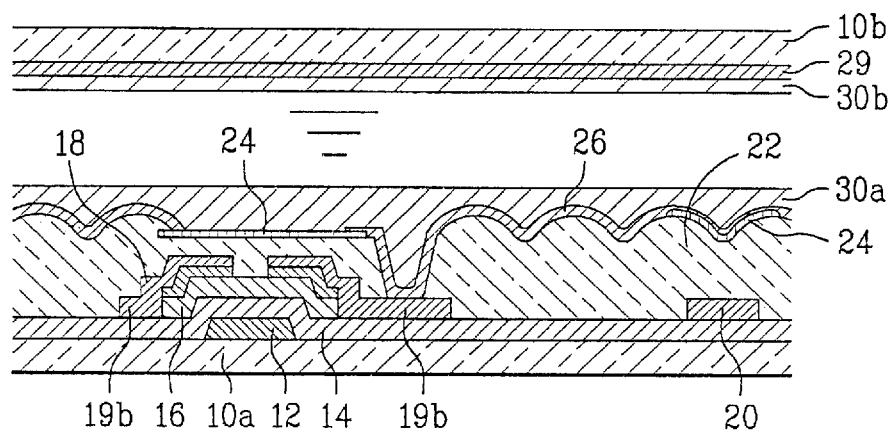
FIG. 2B is a sectional view in accordance with line A—A of FIG. 2A.

FIG. 2A is a plan view of an LCD in accordance with a second embodiment of the present invention, and FIG. 2B is a sectional view in accordance with line A—A of FIG. 2A.

The second embodiment of the present invention proceeds in the same manner as that for the first embodiment except that the reflection electrode 26 on the TFT is removed and the black matrix 24 is extended onto a removed region of the reflection electrode so as to prevent an abnormal electric field from occuring which may be, generated on the TFT.

Figure 3:
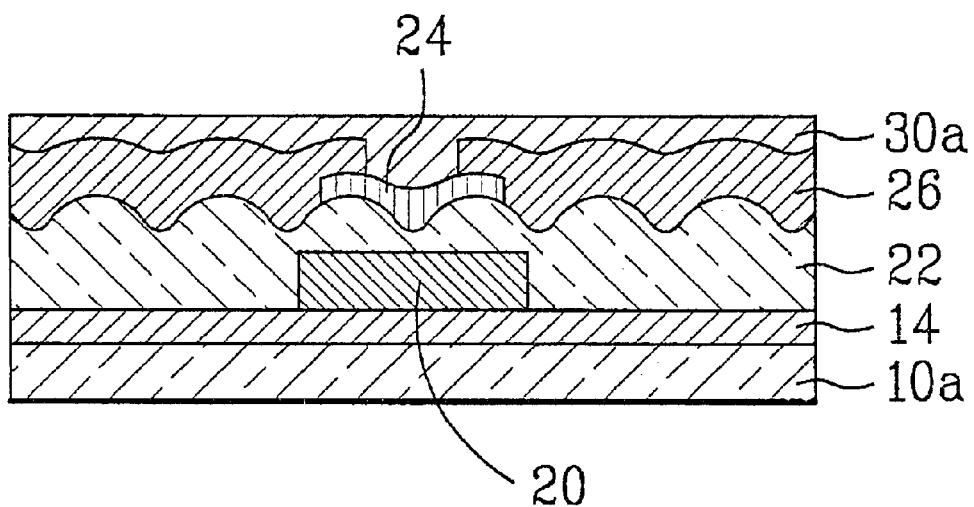
FIG. 3 is a sectional view in accordance with line B—B of FIG. 1A and FIG. 2A.

FIG. 3 is a sectional view in accordance with line B—B of FIG. 1A and FIG. 2A. As shown in the drawing, some parts of the data bus line 20 on the gate insulator 14 are covered by the neighboring reflection electrodes, and the black matrix 24 is formed on the open region between the neighboring reflection electrodes. By this structure, light leakage on the open region is prevented.

According to the present invention, it is possible to achieve a reflective-type LCD having a superior efficiency because the black matrix is on the photoresist layer.

Further, it is possible to manufacture the reflective-type LCD with a simple processes, Other embodiments of the invention will be apparent to those skilled in the art from consideration of the specification and practice of the invention disclosed herein.

It is intended that the specification and examples be considered as exemplary only, with the true scope and spirit of the invention being indicated by the following claims and their equivalents.

What is claimed is:

1. A reflective liquid crystal display device comprising:
   first and second substrates;
   a liquid crystal layer between the first and second substrates;
   a plurality of gate and data bus lines defining pixel regions on said first substrate;
   a plurality of thin film transistors at respective cross points of said gate and data bus lines;
   a photoresist layer on the gate and data bus lines and the thin film transistors, wherein a surface of said photoresist layer is curved by controlling the duration of exposure of the photoresist layer to light;
   a plurality of reflection electrodes on said photoresist layer and electrically coupled to said thin film transistors; and
   a plurality of light shield layers formed at an open region of the photoresist layer on said gate and data bus lines.

2. The device of claim 1, wherein said reflection electrodes are formed on the photoresist layer except over an area of said thin film transistors.

3. The device of claim 1 or 2, wherein said light shield layers are formed over said gate and data bus lines and said thin film transistor.

4. The device of claim 1, wherein some parts of said gate and data bus lines are covered by neighboring reflection electrodes.

5. The device of claim 4, wherein the light shield layer is over the gate bus line at an open region between the neighboring electrodes.

6. The device of claim 4, wherein the light shield layer is over the data bus line at an open region between the neighboring electrodes.

7. The device of claim 1, wherein said reflection electrodes drive liquid crystal molecules in said liquid crystal layer with a counter electrode on said second substrate.

8. The device of claim 1, wherein said light shield layers include a black resin.

9. The device of claim 1, further comprising:
   a first alignment layer over the first substrate; and
   a second alignment layer over the second substrate.

10. The device of claim 9, wherein said first alignment layer includes a material selected from the group consisting of polyvinylcinnamate, polysiloxanecinnamate, cellulose cinnamate, polyimide, polyamide, polyvinylalcohol, polyamic acid and $SiO_2$.

11. The device of claim 9, wherein said second alignment layer includes a material selected from the group consisting of polyvinylcinnamate, polysiloxanecinnamate, cellulose cinnamate, polyimide, polyamide, polyvinylalcohol, polyamic acid, and $SiO_2$.

12. A method for manufacturing a reflective liquid crystal display device, the method comprising the steps of:
   providing first and second substrates;
   forming a plurality of thin film transistors on the first substrate;
   forming a photoresist layer on said first substrate and the thin film transistors, the photoresist layer being curved by controlling the duration of exposure of the photoresist layer to light;
   forming a light shield layer on said photoresist layer at an open region on said gate and data bus lines;
   forming a plurality of reflection electrodes on said photoresist layer and said light shield layer; and
   providing a liquid crystal layer between the first and second substrates.

13. The method of claim 12, wherein said step of forming a plurality of thin film transistors includes the step of forming a plurality of gate and data bus lines.

14. The method of claim 12 or 13, wherein some parts of said gate and data bus lines are covered by neighboring reflection electrodes.

15. The method of claim 12, said step of forming a photoresist layer includes the step of:

depositing a photopolymer resin on said first substrate;

exposing a surface of said photopolymer resin to light; and partially developing said exposed surface of said photopolymer resin.

16. The method of claim 15, wherein said step of exposing the surface of said photopolymer resin is performed using a mask having micro patterns.

17. The method of claim 16, wherein the micro patterns of the mask determine developed and undeveloped regions of the photopolymer resin.

18. A reflective liquid crystal display device comprising:

first and second substrates;

a liquid crystal layer between the first and second substrates;

a plurality of gate and data bus lines defining pixel regions on said first substrate;

a plurality of thin film transistors at respective cross points of said gate and data bus lines;

a photoresist layer on the gate and data bus lines and the thin film transistors, wherein a surface of said photoresist layer is curved by controlling the duration of exposure of the photoresist layer to light;

a plurality of reflection electrodes on said photoresist layer and electrically coupled to said thin film transistors, said reflection electrodes being formed on the photoresist layer except over an area of said thin film transistor; and a plurality of light shield layers formed at an open region between neighboring reflection electrodes, said light shield layers being formed over said gate and data bus lines and said thin film transistor, wherein some parts of said gate and data bus lines are covered by neighboring reflection electrodes.

19. The device of claim 18, wherein said reflection electrodes drive liquid crystal molecules in said liquid crystal layer with a counter electrode on said second substrate.

20. The device of claim 18, wherein said light shield layers include a black resin.

21. The device of claim 18, further comprising:

a first alignment layer over the first substrate; and a second alignment layer over the second substrate.

22. The device of claim 21, wherein said first alignment layer includes a material selected from the group consisting of polyvinylcinnamate, polysiloxanecinnamate, cellulose cinnamate, polyimide, polyvinylalcohol, polyamic acid and $SiO_2$.

23. The device of claim 21, wherein said second alignment layer includes a material selected from the group consisting of polyvinylcinnamate, polysiloxanecinnamate, cellulose cinnamate, polyimide, polyvinylalcohol, polyamic acid and $SiO_2$.

24. A method for manufacturing a reflective liquid crystal display device, the method comprising the steps of:

providing first and second substrates;

forming a plurality of thin film transistors and a plurality of gate and data bus lines on the first substrate;

forming a photoresist layer on said first substrate and the thin film transistors, the photoresist layer being curved by controlling the duration of exposure of the photoresist layer forming a light shield layer on said photoresist layer at an open region between neighboring reflection electrodes;

forming a plurality of reflection electrodes on said photoresist layer and said light shield layer; and providing a liquid crystal layer between the first and second substrates, wherein some parts of said gate and data bus lines are covered by neighboring reflection electrodes.

25. The method of claim 24, wherein said step of forming a photoresist layer includes the step of:

depositing a photopolymer resin on said first substrate;

exposing a surface of said photopolymer resin to light; and partially developed said exposed surface of said photopolymer resin.

26. The method of claim 25, wherein said step of exposing the surface of said photopolymer resin is performed using a mask having micro patterns.

27. The method of claim 26, wherein the micro patterns of the mask determine developed and undeveloped regions of the photopolymer resin.

* * * * *